UNITED STATES PATENT OFFICE.

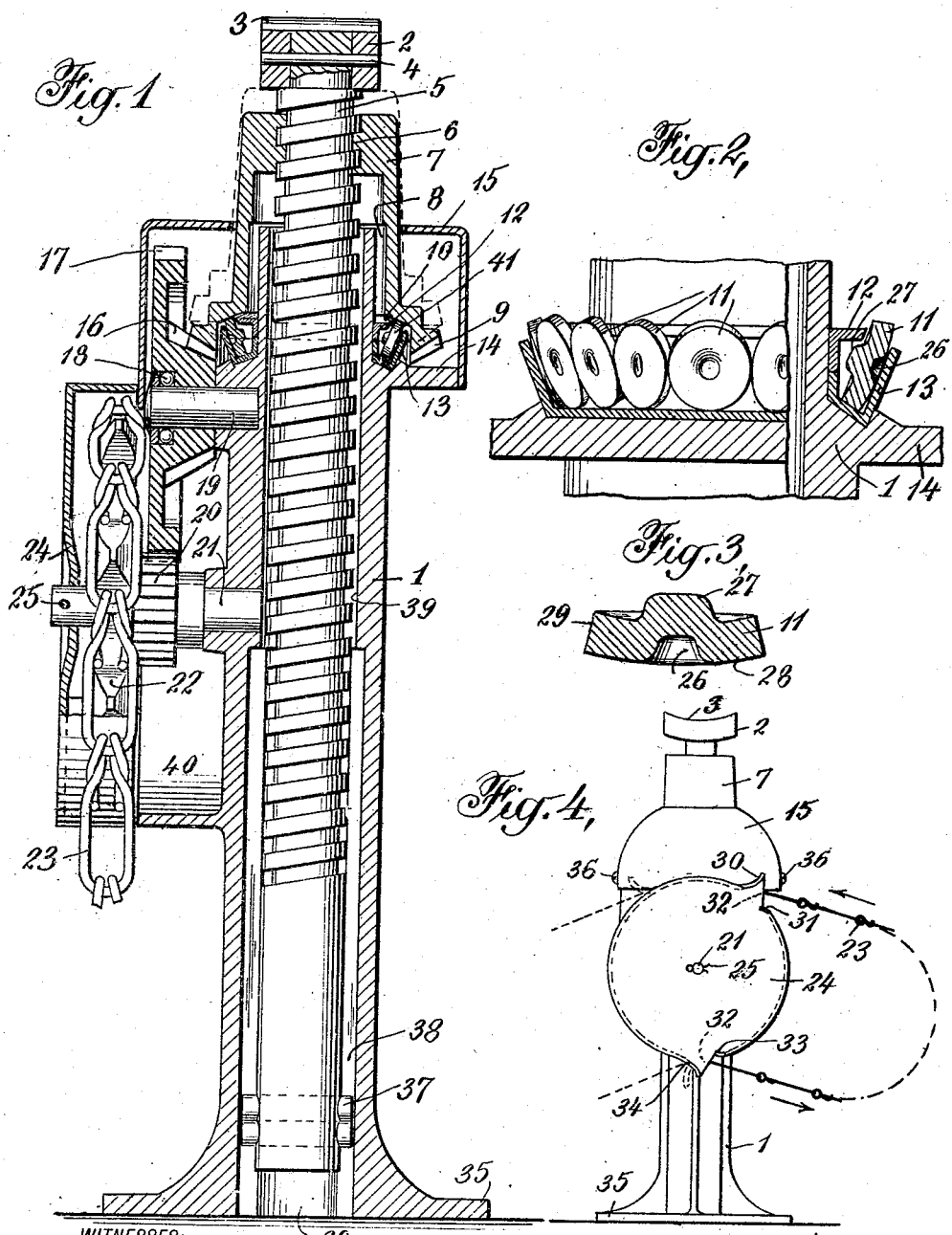

WALTER B. LASHAR, OF BRIDGEPORT, AND THOMAS C. LUCE, OF STRATFORD, CONNECTICUT, ASSIGNORS TO AMERICAN CHAIN COMPANY, INCORPORATED, OF BRIDGEPORT, CONNECTICUT, A CORPORATION OF NEW YORK.

LIFTING-JACK FOR AUTOMOBILES, &c.

1,174,017.   Specification of Letters Patent.   Patented Feb. 29, 1916.

Application filed March 25, 1915. Serial No. 16,875.

*To all whom it may concern:*

Be it known that we, WALTER B. LASHAR, of Bridgeport, Fairfield county, Connecticut, and THOMAS C. LUCE, of Stratford, Fairfield county, Connecticut, have made a certain new and useful Invention Relating to Lifting-Jacks for Automobiles, &c., of which the following is a specification taken in connection with the accompanying drawing, which forms part of the same.

This invention relates especially to lifting jacks for use in connection with automobiles, trucks and other vehicles, etc., in which an endless operating chain and sprocket may be used to actuate the jack preferably in connection with a lifting screw and suitable intermediate actuating connections. The lifting nut coöperating with the screw may engage an alining roller or disk bearing in the frame so as to minimize friction and maintain substantial alinement between the nut and the reducing gear connected with the sprocket. The operating chain may be held in engagement with the sprocket by a reversible guide casing pivoted, for instance, about the sprocket shaft so that the chain may extend in either direction from the jack and operate it effectively from considerable distances through this light flexible connection.

In the accompanying drawings showing in a somewhat diagrammatic way illustrative embodiments of this invention Figure 1 is a vertical section through one form of jack. Fig. 2 is an enlarged section showing a modified bearing construction. Fig. 3 is a detail of one of the bearing disks; and Fig. 4 is a side elevation of the jack shown in Fig. 1.

The jack may have a frame of any desired form and construction, the frame 1 being indicated as formed of malleable iron, cast steel or other suitable strong material and provided with a base 35. The frame may have a central recess or hole 39 to accommodate the jack screw 5 which may have a suitable key, such as 37, projecting laterally from the screw so as to engage suitable key-ways such as 38, on one or both sides of the frame and thus prevent rotation of the screw as it moves up and down in the frame. A head 2 preferably having a curved face 3 to coöperate more advantageously with automobile axles and so forth may be formed on or secured to the lifting screw in any desired way as by the pin 4. The lifting nut 7 may be formed with a threaded aperture 6 coöperating with the screw and may be revolubly mounted in any desired way on the frame so as to be intermittently or continuously rotated by any suitable actuating devices to raise or lower the screw and connected head under service conditions.

It is advantageous to have a suitable alining anti-friction bearing between the nut and frame so as to minimize friction between these parts and also to maintain substantial alinement between them and the coöperating actuating devices. If desired, a self-alining disk or roller bearing may be used in this connection preferably coöperating with a flaring or conical bearing collar 10 formed on the nut below its threaded portion, the upper portion of the nut preferably being formed with an internal recess, such as 8, to accommodate the upper portion of the frame which may in some cases project into the nut as indicated. This anti-friction bearing construction, which is described and claimed in detail in our co-pending application, Serial No. 29,724, filed May 22, 1915, may, if desired, comprise the race 13 mounted in the frame in any desired way as by casting it into the upper part of the frame and adjacent bracket 14 formed thereon so as to be rigidly held in position. The race may be formed with an inclined or conical race guide against which the sides or outer faces of the bearing disks 41 engage so as to be held in proper alinement as they move around the race and these disks may in some cases be formed with substantially cylindrical narrow bearing surfaces as shown in Fig. 1, in which case the race and bearing collar have substantially parallel conical surfaces engaged substantially normally by the bearing disks which thus promote the alinement of the nut under operating conditions. These bearing disks 41 whose thickness is somewhat exaggerated in Fig. 1 for the sake of clearness may as indicated be formed with somewhat convex outer faces engaging the race guide and with an inwardly projecting retainer or hub which holds the disks in the bearing in connection with a suitable retainer flange, such as 12, which may have an inner portion fitting tightly around the adjacent portion of the frame. When the disks have been assembled in the race this bearing collar is forced down in position so as to engage, for instance, with the inner upstanding portion of the race member and thus securely hold the disks in service position while allowing them free movement around the race and ample opportunity for self-adjustment to accommodate such slight irregularities as may be occasioned by the shape of the parts or the irregular loading on the device. In some cases it is, however, more desirable to have these bearing disks formed with conical bearing surfaces 29, as shown in Figs. 2 and 3, which especially with rather wider disks minimizes the friction so that they may have practically pure rolling contact with the coöperating surfaces when the angles of the race and disk are properly arranged. These bearing rolls 11 may be conveniently stamped up out of suitable material such, for instance, as special steel and a single operation will thus serve to stamp the disks out of the sheet metal stock and to form thereon the central retainer or hub 27 and the recess 26 in the opposite side and also to give the disks 11 the desired convex outer faces 28 for coöperation with the conical race guide. The disks may then be finished in any suitable machine in which the bearing surfaces are trued and finally finished as by grinding which enables this finishing operation to be done after the disks have been hardened and tempered in any suitable way. The race 13 may be formed of special steel of self-hardening properties, if desired, and may be stamped up or otherwise formed in substantially the shape indicated and then permanently mounted on the coöperating member as by embedding it in the mold so that it is cast in when the malleable iron frame member is formed. The race may thus be conveniently and cheaply mounted and may be readily given sufficient stiffness to prevent undesirable distortion during the casting operation. Under conditions of operation the bearing disks are guided by the contact between the central portions of their convex outer faces and the race guide so that they are kept substantially in proper position as they move around the race and at the same time undesirable friction and wear on the race is minimized.

The actuating devices for the nut may be of any suitable form and construction and preferably comprise a sprocket or operating wheel and a coöperating flexible tension member or endless operating chain of any suitable length which when six or eight feet long or so is of great advantage for automobile service, since it enables the jack to be operated more effectively and conveniently from the sides or end of the car. Any suitable guiding device, integral with or rigidly or otherwise secured to the frame, may be used to maintain the chain in proper engagement with the sprocket and preferably having any suitable guide lips or curved funnels which the chain enters. It is sometimes desirable to have a swinging or reversible swiveling guide casing to thus maintain the operating chain in proper engagement with the sprocket and allow the chain to extend in either direction from the jack under service conditions.

As shown in Figs. 1 and 4 the guide casing 24 may be formed of sheet metal stamped up or otherwise formed in any suitable way and preferably provided with the guide lips 30, 31, 32, 33, 34, so as to guide both runs of the operating chain 23 adjacent the sprocket wheel 22 within the casing. This casing may be conveniently mounted on the shaft 21 of the sprocket wheel as by the split pin or cotter 25 so as to hold the casing in proper alinement with the sprocket wheel and yet allow its swiveling reverse movement so that the operating chain may be used in the full line position indicated in Fig. 4 or in the dotted line position shown therein when this casing is swung to the other side about the shaft 21, or where the swiveling movement is not desired the casing may for example fit so tightly on the shaft as to be held rigid therewith by the split pin or other means. This shaft may, if desired, be rigidly mounted in the frame 1 of the jack as by casting its inner end into the frame and the intermediate reducing gear or other actuating connections between the sprocket wheel and nut may be given any desired or suitable form to actuate the nut and screw with the necessary power. For example, the drive pinion 20 may be cast integral with or otherwise connected to the sprocket wheel 22 and may mesh with the intermediate gear 17 mounted on a similar cast in stud shaft 19 in the frame as by riveting the end of this shaft over a suitable washer 48 so as to hold the gear in operating position, with suitable bearing balls 18 interposed if desired between these parts as may be done in this connection. The gear 17 may have the beveled pinion 16 cast integral therewith or otherwise connected thereto and adapted to coöperate with the beveled gear 9 on the lifting nut so as to revolve the same in a substantially continuous manner when the operating chain 23 is pulled as indicated in Fig. 4. If desired, a suitable cover 15 may be secured in position as indicated over the gearing as by the screws 36 shown in Fig. 4 and a protecting and alining flange 40 may be formed on the lower part of the frame adjacent the guide casing to prevent undesirable access to the gear at this point.

In operating the device for automobile service it is arranged with the head under the axle or other part to be raised and then the operating chain pulled in the proper direction to raise the lifting screw which holds the jack firmly in position as soon as the head of the jack comes into engagement. Then by pulling on the endless operating chain the head is raised to the desired extent in a substantially continuous manner and this can be done from any advantageous operating position which is much better than where the operator is obliged to work under the machine where the jack is located. After the repair or other work is completed the jack may be lowered by a reverse movement of the endless operating chain which thus offers a cheap, light and flexible connection of considerable advantage for this service, since the chain can be wound around the jack frame or may be otherwise compactly disposed for transportation and at the same time be permanently connected with the jack and ready for instant use without special assembling. It is sometimes desirable to quickly adjust the height of the jack before or after using it and for such preliminary adjustments it is of advantage to have the regular operating gear thrown out of action as by lifting the nut so as to disengage its gear. The cover 15 is formed with an aperture large enough to allow the nut to be lifted into the dotted position shown in Fig. 1 and when the jack is turned into horizontal position, for example, the operator can engage the projecting hub of this nut and spin it around by hand so as to very quickly make an adjustment of several inches.

This invention has been described in connection with a number of illustrative embodiments, forms, proportions, materials, arrangements, and number of parts, to the details of which disclosure the invention is not of course to be limited, since

What is claimed as new and what is desired to be secured by Letters Patent is set forth in the appended claims.

1. In lifting jacks for automobiles and similar vehicles, a frame formed with a shaft and a cast in bearing race, a lifting screw mounted in a recess in said frame, a lifting nut having threaded engagement with said screw and having a bearing collar coöperating with said race, a series of angularly arranged alining disk bearing members coöperating with said race and bearing collar, an operating sprocket mounted on said shaft, an endless operating chain coöperating with said sprocket, a reversible guide casing inclosing said sprocket and having guide lips to guide the chain passing to and from said sprocket and revolubly mounted on said shaft to swing in any direction around said sprocket in operating the jack and reducing actuating connections between said sprocket and nut comprising a pinion connected to said sprocket and intermediate gearing coöperating with a beveled gear on said nut adjacent said bearing collar.

2. In lifting jacks for automobiles and similar vehicles, a frame, a lifting member having a lifting head and mounted in a recess in said frame, an operating sprocket mounted on said frame, an endless operating chain coöperating with said sprocket, a reversible guide casing inclosing said sprocket and having guide lips to guide the chain passing to and from said sprocket and revolubly mounted to swing in any direction around said sprocket in operating the jack and reducing actuating connections between said sprocket and lifting member comprising a pinion connected to said sprocket and a coöperating gear.

3. In lifting jacks for automobiles and similar vehicles, a frame, a lifting screw mounted on said frame, a lifting nut having threaded engagement with said screw, an operating sprocket mounted on said frame, an endless operating chain coöperating with said sprocket, a reversible guide casing inclosing said sprocket and having guide members to guide the chain passing to and from said sprocket and revolubly mounted on said shaft to swing in any direction around said sprocket in operating the jack and reducing actuating connections between said sprocket and nut.

4. In lifting jacks for automobiles and similar vehicles, a frame, a lifting member having a lifting head and mounted on said frame, an operating sprocket mounted on said frame, an endless operating chain coöperating with said sprocket, a movably mounted guide casing inclosing said sprocket to positively maintain said chain in operative engagement with said sprocket throughout a large part of its circumference and having guide members to guide the chain passing to and from said sprocket in operating the jack and reducing actuating connections between said sprocket and lifting member.

5. In lifting jacks for automobiles and similar vehicles, a cast frame formed with a cast in shaft and stud and a cast in bearing race, a lifting screw mounted in a recess in said frame to move without relative rotation of these parts, a lifting nut having threaded engagement with said screw and having a conical bearing collar coöperating with said race, a series of inclined bearing disks coöperating with said race and bearing collar, an operating wheel mounted on said shaft, an operating device coöperating with said wheel, reducing actuating connections between said wheel and nut comprising a pinion connected to said wheel, a coöperating gear mounted on said stud and having a connected beveled pinion coöperating with a beveled gear on said nut adjacent said bearing collar and a cover secured to said frame around said gearing and allowing the nut to be lifted out of engagement with said gearing for rapid manual adjustment.

6. In lifting jacks for automobiles and similar vehicles, a frame formed with a shaft and a bearing race, a lifting screw mounted in a recess in said frame, a lifting nut having threaded engagement with said screw and having a bearing collar coöperating with said race, a series of anti-friction bearing members coöperating with said race and bearing collar, an operating sprocket mounted on said shaft, an endless operating chain coöperating with said sprocket, a guide casing inclosing said sprocket and having guide members to guide the chain passing to and from said sprocket in operating the jack and reducing actuating connections between said sprocket and nut comprising a pinion connected to said sprocket and intermediate gearing coöperating with a beveled gear on said nut adjacent said bearing collar.

7. In lifting jacks for automobiles and similar vehicles, a frame, a lifting screw mounted on said frame, a lifting nut having threaded engagement with said screw, an operating sprocket mounted on said frame, an endless operating chain coöperating with said sprocket, a guide coöperating with said sprocket and having guide members to guide the chain passing to and from said sprocket and revolubly mounted to swing in any direction around said sprocket in operating the jack and reducing actuating connections between said sprocket and nut.

8. In lifting jacks for automobiles and similar vehicles, a lifting member having a lifting head and mounted on said frame, an operating sprocket mounted on said frame, an endless operating chain coöperating with said sprocket, a guide casing mounted on said frame to inclose said sprocket and having guide members to guide the chain passing to and from said sprocket in operating the jack and reducing actuating connections between said sprocket and lifting member.

9. In self supporting lifting jacks for automobiles and similar vehicles, a supporting frame, a lifting member mounted on said frame, an operating sprocket wheel mounted on said frame, reducing actuating connections between said sprocket wheel and lifting member, and means comprising an endless operating chain coöperating with said sprocket wheel to make possible the operation of the jack by lateral pull on said operating chain.

10. In lifting jacks for automobiles and similar vehicles, a supporting frame, a lifting member mounted on said frame, an operating wheel mounted on said frame, reducing actuating connections between said wheel and lifting member, a flexible endless tension operating device coöperating with said wheel, a guide casing movably mounted on said frame to inclose said wheel and hold said device in coöperation with said wheel throughout the greater part of its circumference and having guide members to guide said device passing to and from said wheel in operating the jack.

11. In lifting jacks for automobiles and similar vehicles, a frame, a lifting member mounted on said frame, an operating wheel mounted on said frame, reducing actuating connections between said wheel and lifting member, a flexible endless tension operating device coöperating with said wheel, a guide casing mounted on said frame to inclose said wheel and hold said device in coöperation with said wheel and having guide members to guide said device passing to and from said wheel in operating the jack.

12. In lifting jacks for automobiles and similar vehicles, a frame, a lifting member mounted on said frame, an operating element mounted on said frame, reducing actuating connections between said element and lifting member, a flexible tension operating device coöperating with said element, a guide casing mounted on said frame adjacent said element to normally hold said device in coöperation with said element and having a guide member to guide said device passing to and from said element in operating the jack.

WALTER B. LASHAR.

Witnesses:
WALTER F. FITZGERALD,
WILLIAM SIEGLER.

THOMAS C. LUCE.

Witnesses:
FRED R. WILSON,
WM. C. ETTERSHANK.

Copies of this patent may be obtained for five cents each, by addressing the "Commissioner of Patents, Washington, D. C."